United States Patent Office 2,778,894
Patented Jan. 22, 1957

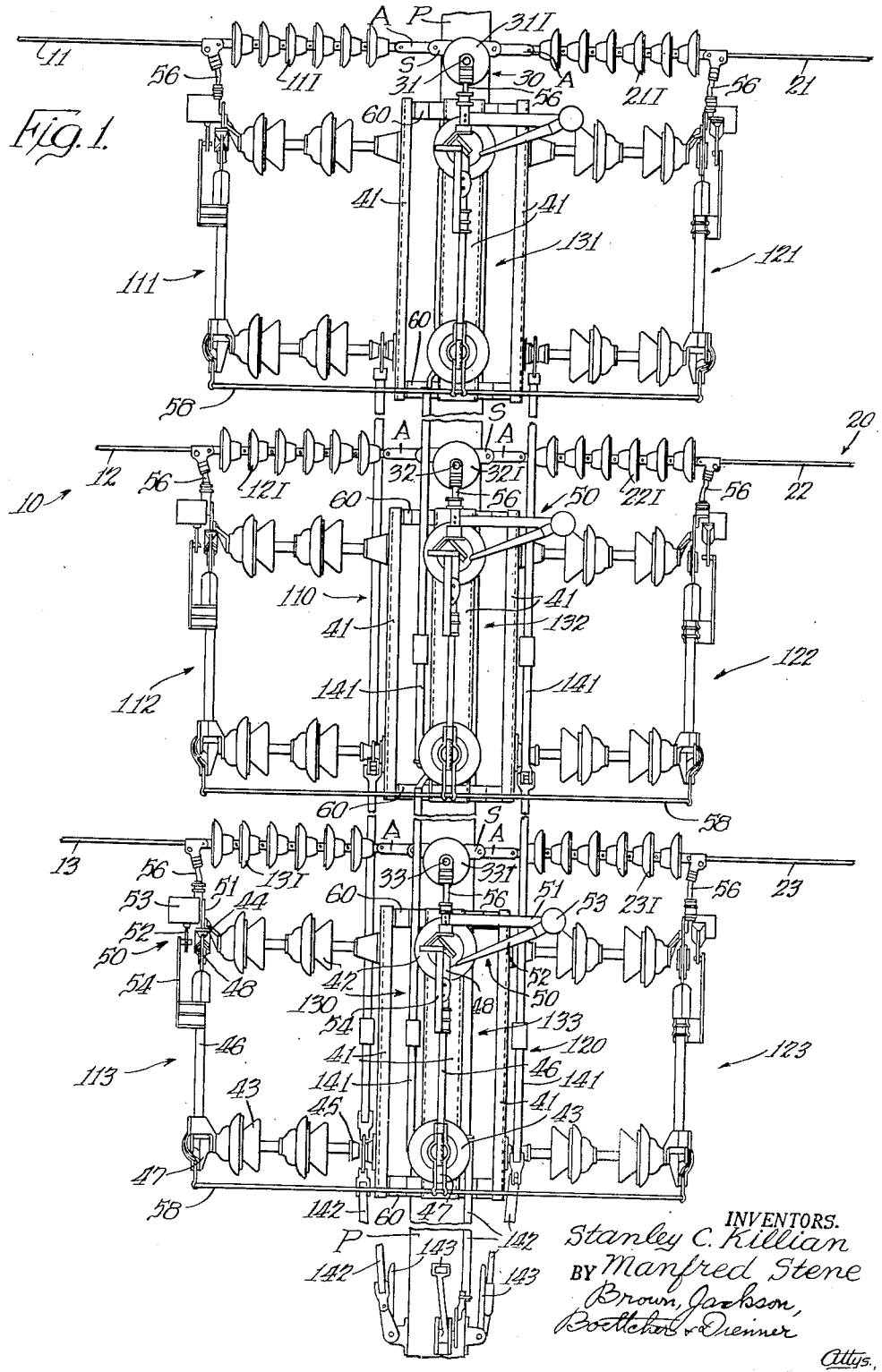

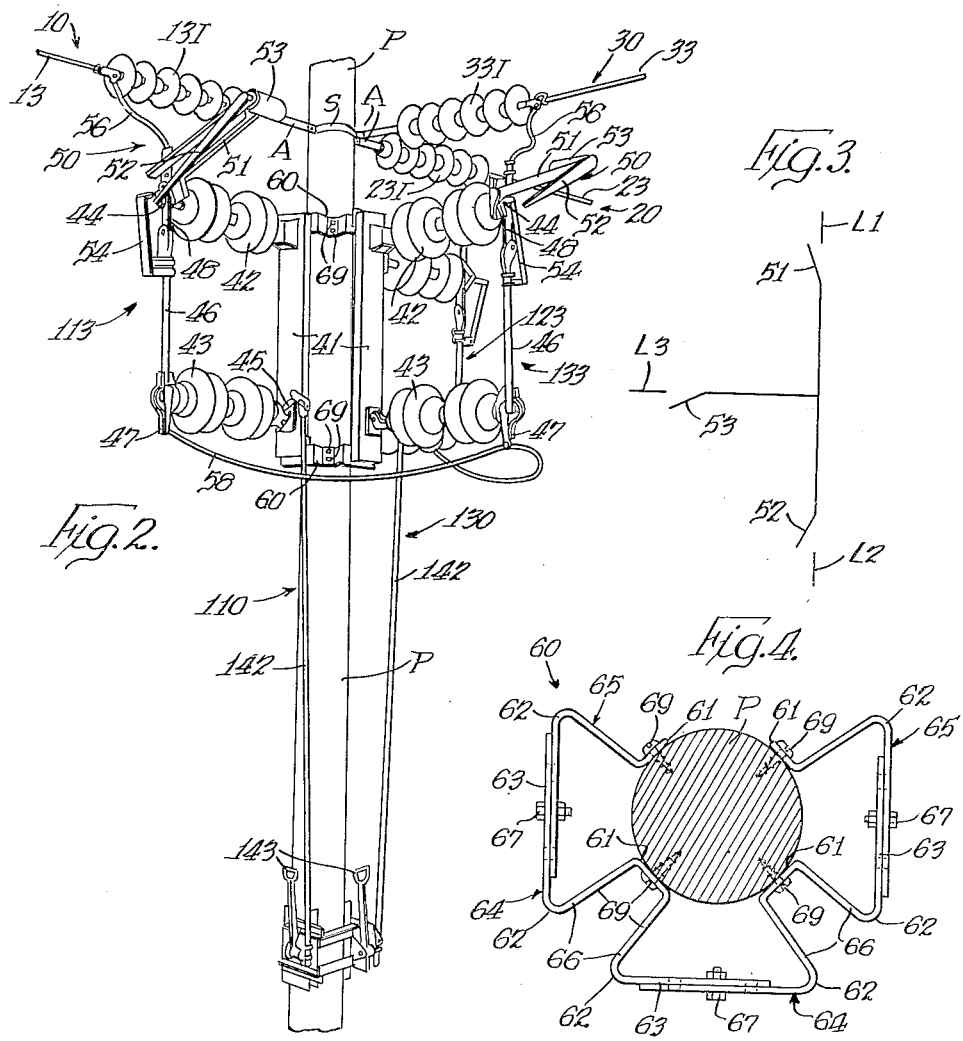

2,778,894

GROUP OPERATED SWITCHES MOUNTED ON ONE POLE

Stanley C. Killian and Manfred Stene, Chicago, Ill., assignors to H. K. Porter Company, Inc. of Pittsburgh, Chicago, Ill., a corporation of Pennsylvania Application June 14, 1954, Serial No. 436,399

12 Claims. (Cl. 200—48)

The present invention relates to group or gang operated switches for high tension electric current distribution systems and the like, and to means for mounting the same on a single pole. In particular, the invention relates to an improved switch mounting and to an improved arrangement of switches to accommodate the mounting on a single pole of, for example, three three-pole switches.

In high tension electric distribution systems, it is common to employ three vertically spaced phases, and at various points in the system, substation feeders may be tapped into the system, two power sources may be employed to energize a single feeder tap, means may be provided for sectionalizing portions of the system, and/or other service requirements may necessitate sectionalizing of, tapping into, or other variations in the system. Usually at each such point, each of the three vertically spaced phases is represented by three lines, say for example, two power sources and a feeder tap, and it is necessary to install switches for controlling current flow in each of the lines. Thus, it is necessary, if full control of the system is to be had, to install nine switches at each location of the character noted. The three switches controlling the corresponding lines in the three phases are properly actuated simultaneously to disconnect and connect the related lines in all three phases. To accomplish this, the corresponding switches in the three phases are mechanically interconnected whereby actuation of one effects actuation of all, thus the name, group or gang operated switches. In conventional group operated switches with conventional mountings, a large number of poles, and a large area within which to erect the poles, would be required. For example, the switches necessary for a tap-off into a substation energized from two sources would require, in a conventional arrangement, at least two poles for the switches at each power source and at least one pole for the switches at the tap-off—five poles in all, and the necessary surface area in which to erect and maintain the poles in properly separated relation. However, in many instances, use of so many poles is highly undesirable, and in other instances impossible, because of space limitations resulting from a narrow right of way or the like.

It is an object of the present invention to overcome the disadvantages of conventional switch arrangements by providing an improved switch arrangement and mounting whereby three three-pole switches, or more or less, may be mounted on a single pole, and in a minimum area.

We are aware of endeavors in the art heretofore to employ an adequate switching arrangement in a small area to meet service requirements of the character above stated, but these have all suffered serious disadvantages with respect to necessitating more than a single pole, occupying too great an area, employing less switches than optimumly desired, and involving complicated and cumbersome mounting means.

It is a further object of the invention to overcome the disadvantages of the above noted endeavors in the art and to afford an improved arrangement and mounting for conventional switch structures, whereby the optimum number of such switches may be mounted in a minimum area on a single pole.

Another object is the provision of improved mounting brackets adapted to be secured in vertically spaced relation on a single pole to accommodate the mounting thereto of the base members of entirely conventional switch structures.

A further object is the provision of an improved switch mounting and arrangement accommodating mounting of a large number of switches on a single pole, and at the same time accommodating attachment of the electric distribution lines directly to the pole by means of conventional pole hardware.

According to the present invention, mounting of several switches on a single pole in a minimum area is accomplished by mounting the switches vertically and parallel to the pole in circumferentially spaced relation about the pole at each vertical phase level. The three wires of each phase, in the example given, are tied or attached directly to the pole by conventional pole hardware at a given level. The three switches for controlling current flow in the respective wires or lines are mounted in the manner above stated, preferably immediately below the said level. Each switch may suitably be conventional in form and mounted on a base by means of spacing insulators which, when the switches are mounted, radiate horizontally outward from the pole. Preferably, two switches are mounted diametrically opposite each other and the third is located at a circumferential spacing of 90 degrees from each of the first two, but other spacings may be adopted within the scope of the invention. Each switch of the three controls one of the three lines and the respective line is preferably connected to the stationary contact of the respective switch. The movable blades of the switches are then electrically interconnected to accommodate any switching arrangement desired between the three lines. At each phase level, which levels are vertically spaced, the above structure is repeated and the corresponding switches of the three groups are preferably aligned vertically. The movable blades of the three switches of each vertically aligned group are mechanically interconnected for simultaneous actuation, whereby each vertically aligned group of switches comprises, in effect, a three-pole switch. Thus, three three-pole switches, according to the invention, are readily mounted on a single pole in a minimum area. Obviously, of course, the number of three-pole switches and/or the number of poles in each switch assembly may be varied to meet the requirements of the electric distribution system. However, the usual arrangement is for three three-pole switches, and such arrangement is thus described herein as the preferred embodiment.

Further according to the present invention, we provide improved mounting brackets for switches to accommodate mounting of three three-pole switches on a single pole in the manner above described, in a ready and convenient manner. Each bracket comprises a relatively thin, relatively narrow, metallic plate or strap means of undulatory form bent or otherwise formed to circumscribe or partially circumscribe a circular pole, the bracket being secured to the peripheral surface of the pole at the radially inward portions of the undulations thereof, the radially outward portions of the undulations defining vertical plane surfaces each adapted for the support of a switch base. In the preferred embodiment, the undulations of the bracket are such as to form three plane mounting surfaces, two diametrically opposite each other in parallel vertical planes and one disposed at a circumferential spacing of 90 degrees from the two in a vertical plane at right angles to the said parallel planes. Also, the bracket is preferably formed of separable parts to accommodate adjustment of the bracket to various pole diameters. Two such brackets are mounted in vertically aligned and vertically spaced relation beneath each phase level of the distribution system to accommodate mounting thereon of the bases of three switches of conventional structure. This bracket means presents substantial advantages over prior proposals in the art for the mounting of group operated switches, because of its simplicity, economy, ease of mounting, compactness, the resulting compactness of the switch arrangement, the accommodation of switches of conventional structure and mounting, and the ease and economy of mounting switches thereon.

Other objects and advantages of the present invention will become apparent in the following detailed description of a preferred embodiment of the invention.

Now, in order to acquaint those skilled in the art with the arrangement of switches provided according to the present invention and the manner of mounting the switches, we shall describe, in connection with the accompanying drawings, a preferred arrangement of three three-pole switches, and a preferred bracket means employed in mounting the switches.

In the drawings:

Figure 1 is an elevational view of the lines of a three phase electric distribution system, three three-pole switches and the switch operating mechanisms as mounted on a single pole according to the present invention, the pole being vertically foreshortened in relation to the switches and operating mechanisms to accommodate a large scale showing of the switches;

Figure 2 is a perspective view of the line and switch mountings at the lower phase of the electric distribution system, the view omitting the switch actuating mechanisms for the upper phases;

Figure 3 is a circuit diagram exhibiting the switching capabilities in each phase of the distribution system;

Figure 4 is a plan view of the improved bracket means of the invention as secured to a pole; and Figure 5 is an elevational view of the bracket means.

Referring now to the drawings, and particularly to Figure 1, we have shown a preferred arrangement as provided according to our invention of three three-pole switches mounted on a single, vertically disposed, cylindrical pole. The pole is indicated at P and the same may suitably comprise a wood pole of the character conventionally used in supporting high tension electric distribution lines. To this pole are connected or attached, by entirely conventional pole hardware, the three lines or phases of three electric transmission systems indicated generally at 10, 20 and 30, respectively. For purposes of clarity of description, these systems may suitably be referred to as a first power source 10, a second power source 20, and a substation tap-off 30 to be energized selectively from either of the sources. The individual lines of the three systems, as indicated at 11, 12 and 13; 21, 22 and 23; and 31, 32 and 33; respectively, are disposed in vertically spaced relation and the corresponding phases of the three systems are mounted at a common level on the pole, so that, at the pole, each phase is represented by three lines, namely 11, 21, 31; 12, 22, 32; and 13, 23, 33; respectively. At each phase, the respective lines are secured to the pole by means of a conventional arrangement comprising (see Figure 2) a strap S encircling the pole P and secured thereto, three mounting arms A radiating outwardly from the pole and strap, and an insulator I mounted on each of the arms A at one end and mounting the respective line at the opposite end thereof. The respective insulators, which radiate horizontally outward from the pole P, are indicated in Figure 1 by the numeral of the line connected thereto with the suffix I. Preferably, the connections of the arms A and the connections of the sections of the insulators I are pivotal connections.

To afford complete control of current flow in the nine lines, it is apparent that nine switches should optimumly be provided to accommodate sectionalizing of the respective transmission systems, isolation of equipment energized from a given system, and the like. In each system, control of current flow in the three phases should simultaneously be effected. Thus, a three-pole switch, or three simultaneously actuated switches, should be provided for each of the systems 10, 20 and 30. Heretofore, endeavors to provide the desired switching capabilities have suffered substantial disadvantages as enumerated hereinbefore. It is an object of our invention to overcome these disadvantages and to afford a capability for mounting the desired nine switches, or three three-pole switches, or more or less, on a single pole and in a minimum area by providing a novel switch arrangement.

According to the present invention, nine switches, that is, three three-pole switches, are mounted on a single pole by the novel arrangement of three switches at each phase level in vertical parallel relation to the pole and to one another and in circumferentially spaced relation to one another about the pole. Corresponding switches at the three levels are then disposed in vertically aligned relation and are mechanically interconnected so that each vertical group of three switches comprises a three-pole switch. Referring now to Figure 1, we have shown a preferred switch arrangement for the electric distribution system above described, wherein current flow in each of the lines 11, 12, 13; 21, 22, 23; and 31, 32, 33 is controlled, respectively, by switches 111, 112, 113; 121, 122, 123; 131, 132, 133. Each of these switches may be of almost any conventional form and all are preferably identical. In the disclosed embodiment, all switches are identical and a description of one will apply to all. For this purpose, reference is made to switches 113 and 133 in Figures 1 and 2.

As shown in Figures 1 and 2, switches 113 and 133 each comprise a rectangular, rigid base 41, and a pair of insulators 42 and 43 mounted on the base in spaced parallel relation and projecting perpendicularly therefrom. In conventional terminology, these switches as shown are mounted vertically, that is, with the base 41 disposed vertically and the insulators extending horizontally therefrom. The upper insulator 42 is rigidly secured to the base 41 and at its outer end the same carries a stationary contact 44 defining a contact jaw or like contact surface. The lower insulator 43 is rotatably mounted on the base 41, and a crank or lever arm 45 is secured to the insulator adjacent the base to afford means for rotating the insulator. At its upper end, the rotatable insulator 43 carries the movable contact or switch blade 46 of the switch. In the switch shown, the blade 46 is secured directly to the rotatable insulator for rotation in a vertical plane at right angles to the plane of the insulators. The switch blade includes a terminal pad 47 at its inner end, and at its outer end, the blade includes a contact portion 48 adapted to be moved into and out of electric contact engagement with the stationary contact 44.

The switch as thus far described comprises a disconnect switch adapted particularly for sectionalization and isolation, but not adapted for interruption of current flow. To accommodate opening of line charging currents, transformer magnetizing currents, some sizable load currents, and the like, the switch includes an interrupter device, indicated generally at 50, best illustrated in switch 133 in Figure 1. The interrupter 50 comprises a stationary mounting arm 51 radiating outwardly, preferably horizontally, from the stationary insulator 42 in the direction of opening movement of the switch blade 46, the arm 51 being physically supported by the insulator 42 and being electrically connected to the stationary contact 44. At its free outer end, the arm 51 pivotally supports an interrupter blade 52, the blade being mounted on a shaft (not shown) within a housing 53 carried by the arm 51 and being spring biased, by a torsion spring (not shown) disposed within the housing, to the position shown in the drawings. The structural arrangement is such that the interrupter blade 52 is electrically connected to the stationary contact 44 of the switch through the mounting arm 51. The switch blade 46 is provided with a supplemental arm 54 in the nature of an arcing horn which is disposed to engage the interrupter blade 52 upon opening movement of the switch blade.

In use, as rotation of the rotatable insulator 43 is commenced to open the switch, the arm 54 on the switch blade 46 engages the interrupter blade 52 to establish two contact paths, one directly between the stationary contact 44 and the switch blade 46, and a second from the contact 44 through the mounting arm 51, the interrupter blade 52 and the supplemental arm 54 to the switch blade 46. Upon continued rotation of the insulator 43, the stationary contact 44 and the switch blade 46 are disengaged without the occurrence of arcing since the switch is still closed through the medium of the interrupter blade 52 and the supplementary arm 54. As the switch blade is moved further toward open position, the supplementary arm 54 on the blade 46 moves the interrupter blade 52 with the blade 46 in the direction of opening movement, thus loading the torsion spring acting on the interrupter blade 52. Due to the pivotal mountings of the interrupter blade 52 and the arm 54, and the relative lengths thereof, the arm 54 continuously moves closer to the end of the blade 52 as opening movement of the switch blade 46 occurs, until the arm 54 clears the end of the interrupter blade 52. At this time, the torsion spring biasing the interrupter blade 52 takes effect to return the blade 52 to its original position at very high speed. As the arm 54 clears the blade 52, the contact 48 on the switch blade 46 is spaced sufficiently far from the stationary contact 44 to prevent arcing, and the torsion spring in the housing 51 returns the blade 52 to its original position adjacent the stationary contact 44 sufficiently fast to break any arc that may occur between the blade 52 and the arm 54, whereby current flow is interrupted and disconnection is effected. Upon closing of the switch, by appropriate rotation of the insulator 43, the contact 48 on the switch blade 46 is moved into direct engagement with the stationary contact 44 and the blade 52 and the supplementary arm 54 automatically assumes the positions shown in the drawings to condition the switch for the actuation above described upon each opening of the switch.

To accommodate the switching capabilities desired in the distribution system as first described, the stationary contact 44 of each switch is connected to the respective line with which the switch is associated by a lead 56, and the switch blades of the three switches at each phase level are electrically interconnected by means of a conductor 58 extending between and connected to the terminal pads of the three switch blades. This leads to the circuit arrangement shown diagrammatically in Figure 3, wherein the lines L1, L2 and L3 are controlled by switches S1, S2 and S3, respectively, which is the arrangement provided in each phase of the apparatus described. Installations in which the present invention has particular application include the situation, for example, wherein lines L1 and L2 are power sources for feeding a substation through the line L3, in which case the lines L1 and L2 can be selectively connected to the line L3, and the line L3 can be isolated from lines L1 and L2. In a second example, the line L1 could be a power source for feeding two systems represented by the lines L2 and L3, in which case the lines L2 and L3 can be selectively or conjointly connected to and disconnected from the line L1, and lines L2 and L3 can be connected or isolated from one another. A variety of other installations wherein the switch arrangement of the invention will have particular application will be readily apparent to those skilled in the art.

With the switch structure shown and described, and with other such switch structures as well, we prefer to mount the three switches in each horizontal or phase grouping, namely; 111, 121, 131; 112, 122, 132; and 113, 123, 133; immediately below the phase to be controlled thereby with the stationary contact disposed upwardly, whereby only a short lead 56 is required between associated lines and switches. The vertical spacing between phases is normally such as to afford more than adequate room between phases for mounting of the horizontal groups of switches, with the switches for the upper phase disposed between the upper and middle phases and the switches for the middle phase disposed between the middle and lower phases. Each switch is preferably mounted vertically, with the insulators 42 and 43 thereof radiating horizontally from the pole and having their axes disposed in a common vertical plane with the axis of the pole. Also, we prefer to mount two of the switches at each phase level in diametrically opposed relation and to dispose the third switch between the two at a circumferential spacing of 90 degrees from each of the two, all three switches being mounted at the same level. This arrangement has particular advantage in the use of switches of the character disclosed in that no interference between switch blades can occur since all move in different planes and all move to the side of the insulators of the adjacent switch opposite the side to which movement of the blade of the said adjacent switch takes place. Obviously, this arrangement of the switches readily accommodates the placement of a fourth switch of the character described in diametrically opposed relation to the third switch above identified. With switches including a blade that moves in the vertical plane of the insulators, for example switches of the character shown in Patent No. 2,527,924, a large number of switches can be mounted at a given level on a single pole by the general arrangement disclosed herein and with appropriate circumferential spacing between switches.

Corresponding switches in the three phases are preferably disposed in vertical alignment to facilitate common or simultaneous actuation of the same. To effect such actuation, the three switches are mechanically interconnected by motion transmitting means indicated generally at 110, 120 and 130 respectively. The motion transmitting means extends between the three switches of the respective vertical or three-pole groupings. Preferably, the motion transmitting means comprises, in each three-pole switch, pipes, tubes, or rods 141 extending between the crank arms 45 of the upper and middle and middle and lower switches, and a pipe, tube, or rod 142 extending from the crank arm of the lower switch to adjacent the base of the pole P. Common actuating means for each three-pole switch is provided adjacent the base of the pole, which means may suitably and most simply comprise a hand lever 142 pivotally mounted on the pole and pivotally connected to the respective rod 142, the levers 143 being selectively operable to effect selective operation of the three three-pole switches.

The switch arrangement of the present invention, as above described, affords substantial advantages over prior endeavors in the art in that a large number, and the optimum number, of switches can be mounted on a single pole in a minimum area. The switches employed may be entirely conventional and no special assembly or construction of the switches on the job is required. The switches are sturdily mounted with their bases immediately adjacent the pole, and the lines in which current flow is to be controlled are connected directly to the pole in a sturdy and practical manner by conventional pole hardware. The particular mounting of each three-pole grouping of switches accommodates a particularly economical and efficient actuating and motion transmitting means for effecting common or simultaneous actuation of all three switches.

To effect convenient and rapid mounting of each horizontal group of switches on a single pole, we prefer to employ a pair of brackets, as indicated at 60, which brackets are shown in detail in Figures 4 and 5. Each bracket preferably comprises a relatively narrow and thin, stiff metallic plate or strap means of undulatory form including radially inward portions 61 defining a base circle corresponding to the circular cross-sectional configuration of the pole P, radially outward portions 62 defining a concentric circle of a greater diameter than the base circle, and plane vertical surfaces 63 comprising chords of the said concentric circle. The vertical surfaces 63, as will be appreciated, accommodate the ready mounting thereto of a switch base, and the radially inward portions 61 are adapted to engage and be secured to the pole. Each bracket 60 is preferably formed of separable parts, which as shown in Figure 3 to accommodate the mounting of three switches, may suitably comprise a pair of W-form frames 64 and a pair of half-W-form frames 65. The W-form frames each include outer divergent legs, which comprise the plane surfaces 63, and inner convergent legs 66 which are joined at the apex of the W, which apex comprises one of the radially inward portions 61. The W-form frames are adapted to be secured to the pole P at the apices thereof at a circumferential spacing of 90 degrees, whereby the adjacent outer legs or plane surfaces 63 of the two W frames are disposed parallel and in abutting relation. To secure the frames together, a fastener 67, in the form of a bolt and nut may suitably extend through the abutting surfaces of the two frames. Preferably, at least one of the abutting legs has a slot 68 therein and the bolt comprises a pin adjustable in the slot to accommodate adjustment of the frames to the circumference of poles of various diameters. As will be appreciated from Figure 3, each W-form frame extends over approximately 90 degrees of the circumference of the pole so that four W-form frames could be secured to the pole completely to encircle the same and define mounting surfaces disposed at circumferential spacings at 90 degrees to accommodate the mounting of up to four switches. In the preferred embodiment, however, three switches are provided, and to complete the bracket for three switch mountings, the two half-W-form frames 65 are employed in conjunction with the two W-form frames 64. As shown, each of the two half-W-form frames comprises a radially outward portion or outer leg constituting a plane surface 63 and a radially inward portion or apex 61, the legs 63 being secured to the adjacent outer leg of the adjacent W-form frame by a slot and bolt connection 67, 68 and the apex 61 being secured to the pole. Preferably, the apices of the frames 64 and 65 are pierced or apertured to accommodate the passage therethrough of screws or bolts 69 by means of which the brackets are secured to the pole. In the case of a wood pole, as is preferred in the use of the present invention, headed wood screws are utilized to secure the brackets to the pole. At the abutting plane surfaces 63 thereof, the frames 64 and 65 are preferably provided with aligned slots 70, to accommodate the ready and convenient mounting of a switch base 41 thereto.

In use, two of the brackets 60 as above described are mounted at a predetermined vertical spacing adjacent each phase level on the pole, the brackets being adjustable to the circumference of the pole, and all brackets being aligned vertically to accommodate vertical mounting of the switches on the surfaces 63, with the switches of each three-pole grouping vertically aligned. Since each pair of brackets presents vertically aligned vertical plane surfaces, which are pierced or slotted for the reception of bolts, complete switch assemblies of conventional design are adapted to be readily and conveniently mounted on the brackets according to the same methods as would be employed for mounting any one of the switches in a conventional vertical mounting. When all of the switches have been mounted on the brackets 60, in the simple and convenient manner described, each of the switches is electrically connected to the respective transmission line. The switches at each phase level are then electrically interconnected, and the three-pole switches in vertical alignment are mechanically interconnected with one another and the respective actuating means to complete the assembly.

The embodiment of the invention described hereinbefore is that which we prefer and the one that would be employed in the majority of installations of the character referred to. However, if a slack span is used on the transmission line, the strain string or insulator I may be eliminated, a heavy duty insulator stack substituted for the contact insulator stack 42 of the appropriate switch and the pull-off taken directly off this heavy duty stack. Other modifications will, of course, occur to those skilled in the art.

From the foregoing, it will be appreciated that the present invention not only affords improvements as to the provision of an optimum number of switches mounted on a single pole in a minimum area, but that the provision and assembly of the switch arrangement is very readily and economically accomplished, and that the resultant structure is very compact, neat in appearance, and efficient in use.

While we have described what we regard to be a preferred embodiment of our invention, it will be appreciated by those skilled in the art that various changes, rearrangements and modifications may be made in the preferred embodiment without departing from the scope of the invention, as defined by the appended claims.

We claim:

1. In an electric distribution system having a plurality of lines and a single pole, a plurality of switches each controlling current flow in one of the lines, said switches being mounted on the pole with their longitudinal axes disposed parallel to one another and the pole and in circumferentially spaced relation to one another about the pole.

2. In an electric distribution system having a plurality of lines and a single vertical pole, a plurality of switches each controlling current flow in one of the lines, said switches being mounted vertically on the pole in parallel relation to each other and the pole and in circumferentially spaced relation to one another about the pole, said switches each including a base disposed vertically and insulator means mounted on said base and radiating horizontally outward from the pole.

3. In an electric distribution system having three lines at a substantially common level and a single vertical pole, three switches mounted on the pole in vertical relation parallel to each other and in circumferentially spaced relation about the pole, each of said switches including a movable contact and a stationary contact, corresponding contacts of said switches being electrically interconnected, the three lines being electrically connected respectively to the other contact of said switches.

4. In an electric distribution system having three lines attached at a common level to a single vertical pole, three switches mounted on the pole in vertical relation parallel to each other and the pole and in circumferentially spaced relation about the pole, each of said switches including a base disposed vertically, a pair of insulators mounted on said base and radiating horizontally outward from the pole in vertically spaced relation, a stationary contact mounted on the insulator adjacent the level at which the lines are connected to the pole and a movable switch blade mounted on the other insulator, the movable switch blades of said switches being electrically interconnected, the three lines being electrically connected respectively to the stationary contact of said switches.

5. In an electric distribution system, a single vertical pole, three electric transmission lines attached to said pole at a common level, insulators connecting said lines directly to said pole, three switches mounted on said pole, each electrically connected to one of said lines and controlling current flow in the respective line, said switches being mounted vertically on said pole in parallel relation to one another and said pole and in circumferentially spaced relation to one another about the pole, two of said switches being mounted in diametrically opposed relation and the third being mounted between the two at a circumferential spacing of 90 degrees from each of the two.

6. In a plural phase electric distribution system having vertically spaced phases and a plurality of lines in each phase, a single pole, a plurality of switches each disposed adjacent and controlling current flow in one of the lines, the switches controlling corresponding lines in the phases being vertically aligned and spaced from one another, the switches controlling the lines of each phase being disposed at a common level, the switches at each level being mounted vertically on said pole in parallel relation to one another and the pole and being circumferentially spaced from one another about the pole, and common actuating means for each group of vertically aligned switches.

7. In a three phase electric distribution system of the character described wherein each phase includes three transmission lines, the three lines of each phase being at a common level, the levels of the three phases being vertically spaced, a single pole, three three-pole switches mounted on said pole, each three-pole switch including three vertically aligned and spaced switches each disposed adjacent the corresponding one of the lines in each phase, each of the three switches in each three-pole switch controlling the current flow in the adjacent one of the lines, said three three-pole switches being mounted vertically on said pole parallel to said pole and to one another and in circumferentially spaced relation to one another about said pole, and common actuating means for each three-pole switch to effect simultaneous actuation of the switches thereof.

8. A plural phrase electric distribution system as set forth in claim 6, wherein each of said switches is mounted vertically on said pole parallel to said pole and includes a pair of vertically spaced insulators radiating horizontally outwardly from said pole beneath the respective line, each of said switches including a stationary contact mounted on the upper insulator and connected to the respective line and a movable switch blade operatively associated with the lower insulator, the switches controlling current flow in the lines of each phase having the switch blades thereof electrically connected.

9. In an electric distribution system having a plurality of lines at a substantially common level and a single vertical cylindrical pole, a pair of brackets mounted on the pole in vertically spaced relation adjacent the lines, each of said brackets comprising a narrow stiff strap of radially undulating form including radially inward portions attached to said pole and defining a base circle corresponding to the circular cross section of the pole and radially outward portions comprising chords of a concentric circle of a larger diameter than said base circle, said radially outward portions comprising a plurality of circumferentially spaced vertical plane surfaces, and a plurality of switches each controlling current flow in one of the lines, each of said switches comprising a complete switch assembly including a pair of insulators mounted in perpendicular relation on a supporting base, the base of each switch being secured to corresponding ones of the said plane surfaces of said pair of brackets, whereby said switches are mounted vertically on the pole in parallel relation to each other and the pole and in circumferentially spaced relation to one another about the pole with the insulators thereof radiating horizontally outward from the pole.

10. A bracket for mounting the switches of high tension electric distribution systems on a single pole, comprising a plurality of separable parts, some of said parts comprising W-form frames and the others comprising half-W-form frames, said frames to be secured at the apex thereof to the pole and including outer leg portions defining plane surfaces spaced from the pole, the plane surfaces of the outer legs of adjacent frames being parallel and abutting one another and having mating slot and pin portions adjustably connecting said plane surfaces of adjacent frames together, said slot and pin portions accommodating adjustment of said frames with respect to one another to accommodate adjustment of the bracket to the circumference of a pole, said plane surfaces accommodating the mounting thereon of a switch.

11. A bracket for mounting the switches of high tension electric distribution systems on a single pole, comprising a plurality of separable parts, at least some of said parts comprising W-form frames to be secured at the apex thereof to a pole and including outer leg portions defining plane surfaces, the plane surfaces of the outer legs of adjacent frames being parallel and abutting one another, and fastener means adjustably securing said plane surfaces of adjacent frames together, said frames being adjustable with respect to one another to accommodate adjustment of the bracket to the circumference of a pole, said plane surfaces accommodating the mounting thereon of a switch.

12. A bracket for mounting control apparatus in high tension electric distribution systems on a generally cylindrical pole, comprising a narrow stiff strap means of undulatory form including radially inward portions to be secured to a pole and defining a base circle corresponding to the circular cross section of the pole, and radially outward portions comprising chords of a concentric circle of a larger diameter than the said base circle, said radially outward portions comprising plane vertical surfaces accommodating mounting thereon of control apparatus.

References Cited in the file of this patent

UNITED STATES PATENTS

| | | |
|---|---|---|
| 1,995,126 | Knowles | Mar. 19, 1935 |
| 2,470,576 | Pollock et al. | May 17, 1949 |

FOREIGN PATENTS

| | | |
|---|---|---|
| 415,818 | Great Britain | Sept. 6, 1934 |